United States Patent
Fry et al.

(10) Patent No.: US 12,466,142 B2
(45) Date of Patent: Nov. 11, 2025

(54) COMPRESSION RESIN TRANSFER INFUSION METHODS

(71) Applicant: The Boeing Company, Arlington, VA (US)

(72) Inventors: Jessica Offutt Fry, Charleston, SC (US); Heather Marie Wadsworth, Ladson, SC (US); David Earl Reed, Summerville, SC (US); Kevin Donald Gordon, Summerville, SC (US); Mark R. Brei, Ladson, SC (US); Chloe E. Klusman, Ladson, SC (US)

(73) Assignee: The Boeing Company, Arlington, VA (US)

( * ) Notice: Subject to any disclaimer, the term of this patent is extended or adjusted under 35 U.S.C. 154(b) by 151 days.

(21) Appl. No.: 18/501,423

(22) Filed: Nov. 3, 2023

(65) Prior Publication Data

US 2025/0144895 A1    May 8, 2025

(51) Int. Cl.
*B29C 70/48* (2006.01)

(52) U.S. Cl.
CPC .................................. *B29C 70/48* (2013.01)

(58) Field of Classification Search
CPC . B29C 70/48; B29C 70/467; B29C 45/14311; B29C 70/546
See application file for complete search history.

(56) References Cited

U.S. PATENT DOCUMENTS

| | | | |
|---|---|---|---|
| 6,793,854 B1 * | 9/2004 | Kirjavainen | B29C 55/005 264/210.4 |
| 9,457,503 B2 * | 10/2016 | Kobayashi | B29C 45/02 |
| 2006/0027314 A1 * | 2/2006 | Jones | B29C 33/10 156/245 |
| 2012/0108132 A1 * | 5/2012 | Fang | C08J 5/248 428/221 |

FOREIGN PATENT DOCUMENTS

| | | |
|---|---|---|
| CA | 2367731 C | 11/2008 |
| EP | 2855122 B1 | 4/2020 |
| WO | 2022081861 A1 | 4/2022 |
| WO | 2022081884 A1 | 4/2022 |
| WO | 2022265727 A1 | 12/2022 |

OTHER PUBLICATIONS

Extended European Search Report, dated Mar. 20, 2025, regarding European Application No. 24202480.0, 9 pages.

* cited by examiner

*Primary Examiner* — Matthew J Daniels
(74) *Attorney, Agent, or Firm* — Yee & Associates, P.C.

(57) ABSTRACT

Methods of compression resin transfer infusion are presented. A dry preform with a thermoplastic veil is placed onto a lower mold die. An upper mold die is placed over the lower mold die to create an infusion and cure tool having a sealed cavity holding the dry preform, the sealed cavity defining a gap, the gap corresponding to a cavity volume equivalent to an amount of resin to infuse the dry preform. Resin is injected into the gap of the sealed cavity while the infusion and cure tool is maintained at an infusion tempera- (Continued)

ture. The upper mold die is lowered to infuse the dry preform to form a resin-infused preform. The resin-infused preform is cured within the infusion and cure tool to form a cured composite part, wherein curing occurs at a curing temperature higher than the infusion temperature.

21 Claims, 10 Drawing Sheets

COMPRESSION RESIN TRANSFER INFUSION METHODS

BACKGROUND INFORMATION

1. Field

The present disclosure generally relates to methods for forming composite structures, and more particularly, to high rate resin infusion technology.

2. Background

Composite materials and structures, including resin-infused carbon-fiber laminates, are commonly used in applications requiring high strength and light weight. For example, in the aerospace industry, composite structures are used in increasing quantities to form the fuselage, wings, and other components of aircraft. However, conventional methods and systems for forming composite structures are often time- and labor-intensive, especially for composite structures combining complementary pieces, such as fuselage skins and stringers into a single composite structure. Further, using current aerospace composite-fabrication materials and methods to produce composite structures at high rates would require multiple sets of tooling and processing equipment along with the factory-floor space required to accommodate said equipment. Thus, fabricating high-quality composite structures with aerospace-grade materials to meet performance characteristics at high rates using current production methods would be difficult and expensive, limiting the rate of production at an affordable cost.

Therefore, it would be desirable to have a method and apparatus that takes into account at least some of the issues discussed above, as well as other possible issues. For example, it would be desirable to present systems and methods for forming composite structures that offer improvements in a rate of production, particularly for composite structures of larger size and complexity, as typically associated with the aerospace industry.

SUMMARY

An embodiment of the present disclosure provides a method of compression resin transfer infusion. A dry preform with a thermoplastic veil is placed onto a lower mold die. An upper mold die is placed over the lower mold die to create an infusion and cure tool having a sealed cavity holding the dry preform, the sealed cavity defining a gap, the gap corresponding to a cavity volume equivalent to an amount of resin to infuse the dry preform. Resin is injected into the gap of the sealed cavity while the infusion and cure tool is maintained at an infusion temperature. The upper mold die is lowered to infuse the dry preform to form a resin-infused preform. The resin-infused preform is cured within the infusion and cure tool to form a cured composite part, wherein curing occurs at a curing temperature higher than the infusion temperature.

Another embodiment of the present disclosure provides a method of compression resin transfer infusion. Resin is injected into a gap of a sealed cavity of an infusion and cure tool while the infusion and cure tool is maintained at an infusion temperature in the range of 130-160 degrees Celsius. An upper mold die of the infusion and cure tool is lowered to infuse a dry preform in the sealed cavity with the resin to form a resin-infused preform. The temperature of the infusion and cure tool is increased from the infusion temperature to a curing temperature at a ramp rate of 1-3 degrees Celsius. The resin-infused preform is cured in the infusion and cure tool to form a cured composite part, wherein curing occurs at the curing temperature in a range of 165-190 degrees Celsius, wherein the curing temperature is sufficient to cause a thermoplastic veil in the dry preform to expand and melt.

Yet another embodiment of the present disclosure provides a method of compression resin transfer infusion to form cavitation bubbles in the cured composite part. Resin is injected into a gap of a sealed cavity of an infusion and cure tool while the infusion and cure tool is maintained at an infusion temperature in the range of 130-160 degrees Celsius. An upper mold die of the infusion and cure tool is lowered at a closing speed of 0.01-0.2 in/min to infuse a dry preform in the sealed cavity through its thickness with the resin to form a resin-infused preform, the dry preform comprising a thermoplastic veil. The temperature of the infusion and cure tool is increased from the infusion temperature to a curing temperature. The resin-infused preform is cured in the infusion and cure tool to form a cured composite part, wherein curing occurs at the curing temperature in a range of 165-190 degrees Celsius and curing pressure in a range of 10-100 psig. A temperature of the infusion and cure tool is lowered after curing to generate cavitation bubbles in the thermoplastic veil as the thermoplastic veil cools below a melting temperature of the thermoplastic veil.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
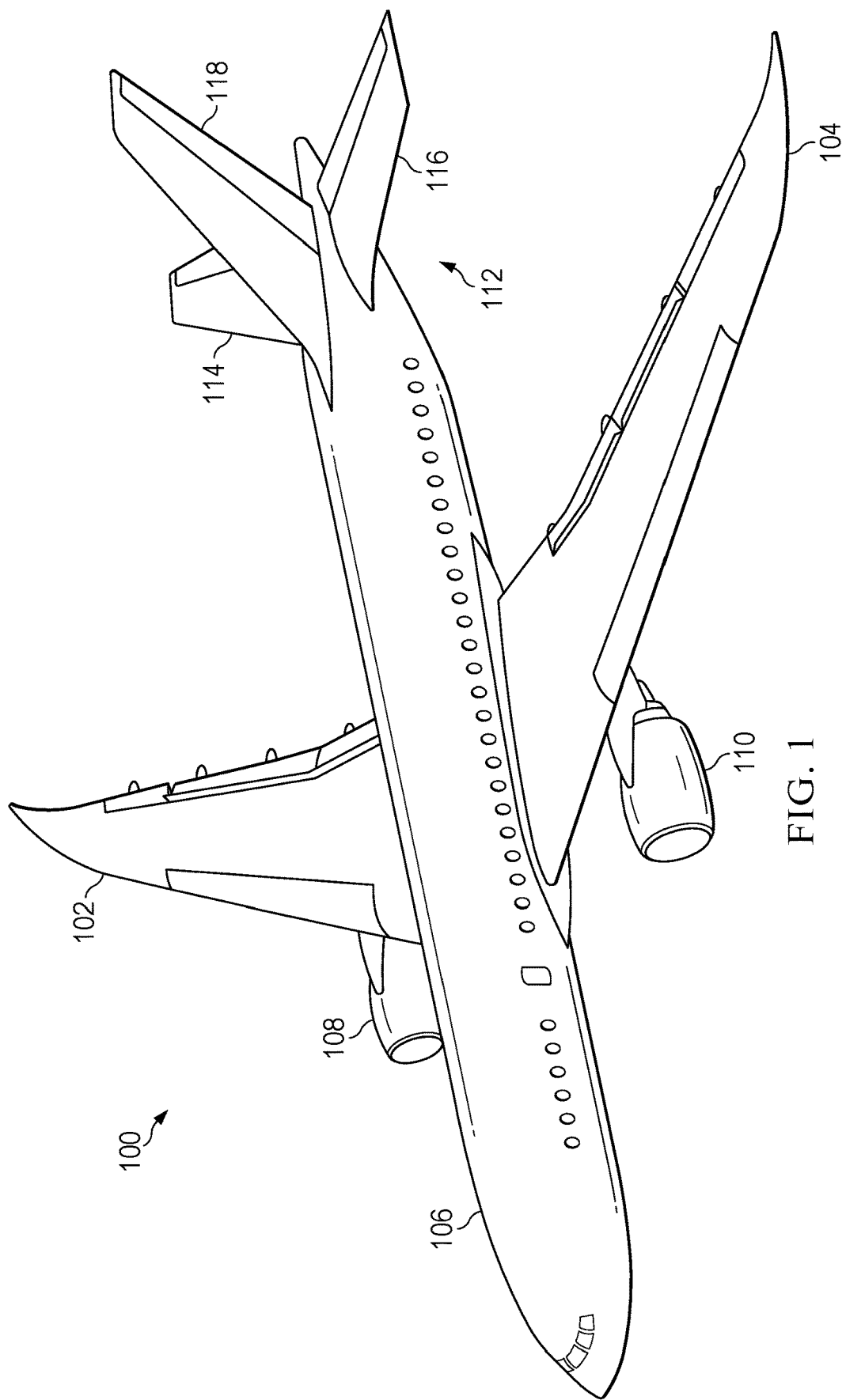
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite structures formed using compression resin transfer infusion methods. In some illustrative examples, portions of body 106, wing 102, or wing 104 can include a composite structure formed using compression resin transfer infusion methods.

Figure 2:
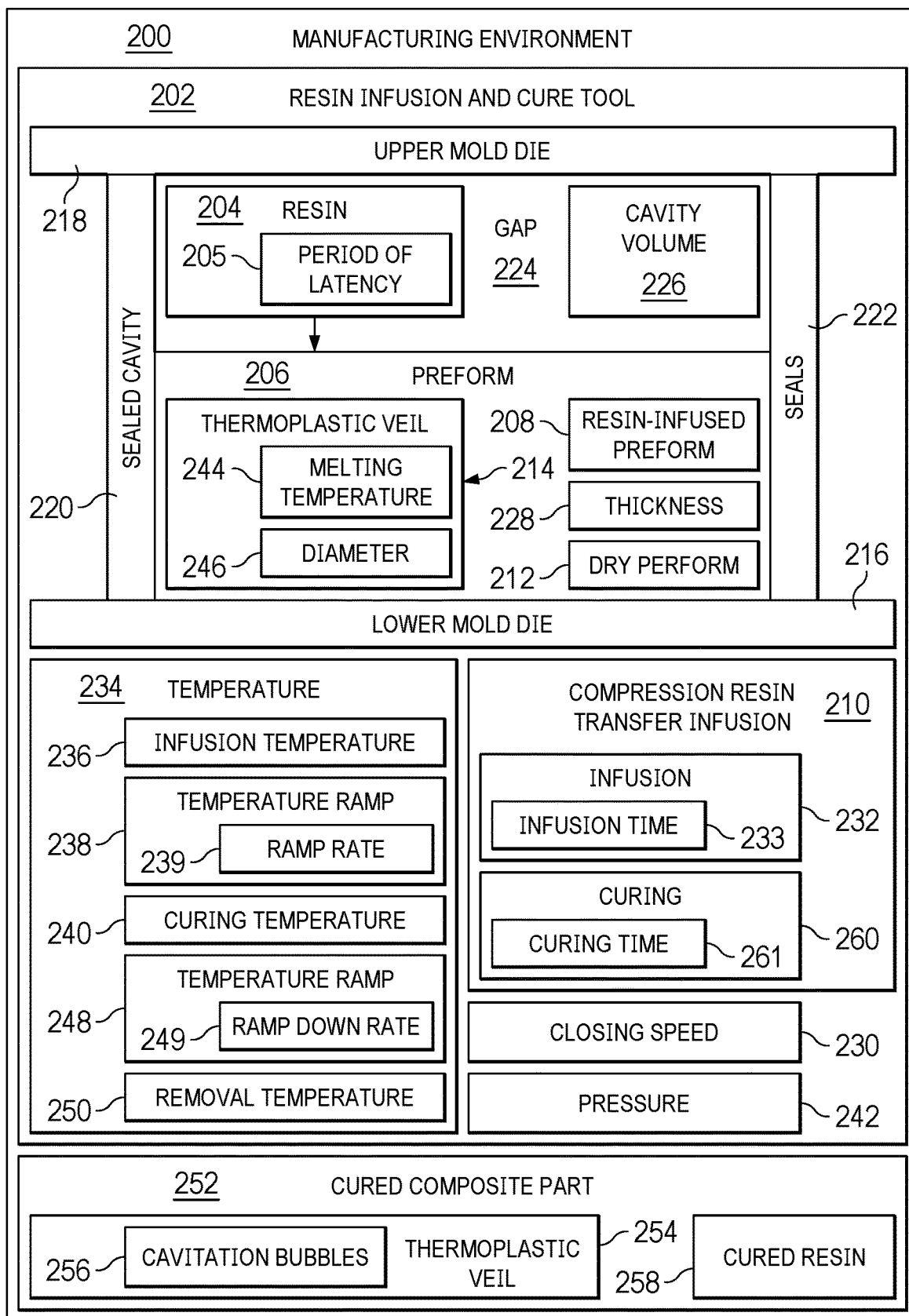
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Resin infusion and cure tool 202 in manufacturing environment is used to infuse resin 204 into preform 206 and cure resin-infused preform 208. Compression resin transfer infusion 210 performed using resin infusion and cure tool 202 utilizes multiple temperatures.

Resin infusion and cure tool 202 comprises upper mold die 218 and lower mold die 216 sealed together by seals 222. Sealed cavity 220 is present between upper mold die 218 and lower mold die 216.

Compression resin transfer infusion 210 comprises placing dry preform 212 with thermoplastic veil 214 onto lower mold die 216 of resin infusion and cure tool 202. The raw material of dry preform 212 can be formed of any desirable type of fiber. In some illustrative examples, dry preform 212 can have a carbon-fiber content up to 70 weight percent. In some illustrative examples, the raw material of dry preform 212 can include carbon fiber with a knit thread, carbon fiber with a knit thread and a thermoplastic veil, or carbon fiber with a veil. In some illustrative examples, dry preform 212 material can include carbon-fiber-based fabrics, such as non-crimp fabrics (NCFs). In some illustrative examples, dry preform 212 material is a dry multiaxial non-crimped fabric (MA-NCF). In some illustrative examples, dry preform 212 material is a dry unidirectional non-crimped fabric (UD-NCF).

Upper mold die 218 is placed over lower mold die 216 to create infusion and cure tool 202 having sealed cavity 220 holding dry preform 212. Sealed cavity 220 defines gap 224. Gap 224 corresponds to cavity volume 226 equivalent to an amount of resin 204 to infuse dry preform 212. Resin 204 is injected into gap 224 of sealed cavity 220 while infusion and cure tool 202 is maintained at infusion temperature 236.

In some illustrative examples, resin 204 is an epoxy resin. The resin can have a period of latency 205. In some illustrative examples, resin 204 comprises a pre-mixed and degassed epoxy resin having period of latency 205. In some illustrative examples, resin 204 can include epoxies, cyanate esters, benzoxazines, bismaleimides, polyimides, cross-linkable thermoplastics, and in situ polymerizable thermoplastics, or combination thereof. In some illustrative examples, resin 204 can include, without limitation, epoxy/cyanate esters and epoxy/benzoxazines.

As used herein, period of latency 205 of resin 204 refers to the time before unacceptable increases in resin viscosity are reached after mixing the components of resin 204. For example, an epoxy resin can be formed by mixing an epoxy component with a hardener, such as an amine. Once mixed, the epoxy resin will crosslink, increasing its viscosity. The resin can have a period of latency from about 20 minutes to about 1 hour. For example, the resin can have a period of latency of about 30 minutes or less.

Upper mold die 218 is lowered to infuse dry preform 212 to form resin-infused preform 208. Lowering upper mold die 218 infuses resin 204 into dry preform 212 through thickness 228 of dry preform 212.

Aspects of infusion 232, including closing speed 230, infusion temperature 236, and infusion time 233, are configured to produce cured composite part 252 with desirable values for stiffness and strength. In some illustrative examples, aspects of infusion 232, including closing speed 230, infusion temperature 236, and infusion time 233, are configured to reduce processing time for cured composite part 252. In some illustrative examples, upper mold die 218 is lowered at closing speed 230 of 0.01-0.2 in/min. In some illustrative examples, infusion temperature 236 is in the range of 130-160 degrees Celsius.

Resin-infused preform 208 is cured within infusion and cure tool 202 to form cured composite part 252. Curing 260 occurs at curing temperature 240 higher than infusion temperature 236. Curing temperature 240 is sufficient to cause thermoplastic veil 214 to expand and at least one of soften or melt. To bond sufficiently to resin 204, thermoplastic veil 214 at least softens. In some illustrative examples, curing temperature 240 is at least melting temperature 244 of thermoplastic veil 214.

Temperature 234 of infusion and cure tool 202 is lowered after curing 260 from curing temperature 240 at ramp down rate 249. Curing temperature 240 and ramp down rate 249 are selected to produce desired bonding between thermoplastic veil 254 and resin 204 in cured composite part 252. Curing temperature 240 and ramp down rate 249 are selected to generate cavitation bubbles 256 in thermoplastic veil 254 in cured composite part 252. In some illustrative examples, cavitation bubbles 256 are an indication of a desired level of bonding between thermoplastic veil 254 and resin 204 in cured composite part 252.

Time, temperature, pressure 242, and other aspects of curing 260 are controlled to produce cured composite part 252 with desired stiffness and strength. In some illustrative examples, curing 260 takes between 45-180 minutes. In some illustrative examples, curing temperature 240 is in the range of 165-190 degrees Celsius. In some illustrative examples, temperature ramp 238 to cure between infusion temperature 236 and curing temperature 240 has ramp rate 239 of 1-3 degrees Celsius/min. In some illustrative examples, a difference between infusion temperature 236 and curing temperature 240 is 40 degrees Celsius or less. In some illustrative examples, pressure 242 within sealed cavity 220 is 10-100 psig after lowering upper mold die 218, and pressure 242 is maintained at 10-100 psig during curing 260.

Curing temperature 240 is selected based on resin 204 and thermoplastic veil 214. In some illustrative examples, curing temperature 240 can be a temperature from about 170° C. to about 190° C. Curing temperature 240 is selected to generate desirable bonding between resin 204 and thermoplastic veil 214.

Aspects of infusion 232 and curing 260 can be set to maximize a production rate of resin infusion and cure tool 202. Aspects of infusion 232 and curing 260 can be set to maximize a production rate of cured composite part 252.

Curing time 261 is set to fully cure preform 206 in resin infusion and cure tool 202. Curing time 261 can be from about 45 minutes to about 180 minutes.

In some illustrative examples, cured composite part 252 is removed from infusion and cure tool 202 while infusion and cure tool 202 is still warm. In some illustrative examples, cured composite part 252 is removed from infusion and cure tool 202 while infusion and cure tool 202 is at temperature 234, removal temperature 250, in a range of 130-160 degrees Celsius.

Cured composite part 252 has a sufficient degree of stiffness and strength such that cured composite part 252 can be safely removed from resin infusion and cure tool 202. Cured composite part 252 is sufficiently cured to maintain its shape without any distortion or damage after removal from resin infusion and cure tool 202. Additionally, after removal from resin infusion and cure tool 202, post-curing is not performed on cured composite part 252. Cured composite part 252 has sufficient stiffness and strength to meet desired targets without additional post-curing.

Each of infusion temperature 236 and curing temperature 240 is a temperature value having a variance of less than ±5° C. of the desired value. For example, a temperature of 100° C. would refer to a temperature maintained between 95° C. and 105° C.

Temperature 234 of resin infusion and cure tool 202 can be maintained/managed by electrical or resistive heating, inductive heating, liquid heating, steam heating, or the like. In some implementations, a mass and heat capacity of lower mold die 216 are configured to prevent large temperature fluctuations due to an external environment or any exothermic or endothermic reactions. For example, lower mold die 216 can comprise materials, such as steel, aluminum, Invar, and the like, selected for their high heat capacity. Similarly, a large mass can help maintain a constant temperature by acting as a heat sink to control exothermic reactions as well maintaining temperature during ambient losses.

Cured composite part 252 comprises a desired level of bonding between cured resin 258 and thermoplastic veil 254. Due to temperature ramp 238, resin 204 maintains mobility longer and can gel (vitrify) after thermoplastic veil 214 reaches melting temperature 244. In some illustrative examples, thermoplastic veil 214 has melting temperature 244 over 170 degrees Celsius. As thermoplastic veil 214 melts it expands. After thermoplastic veil 214 melts, resin 204 forms a network around thermoplastic veil 214 while thermoplastic veil 214 is expanded, and resin 204 bonds with the surface of thermoplastic veil 214.

As thermoplastic veil 214 cools back below the melting temperature 244, thermoplastic veil 214 tries to contract back to its original size. As thermoplastic veil 214 is now bonded to resin 204, thermoplastic veil 214 has nowhere to contract from, resulting in cavitation bubbles 256 in the center of thermoplastic veil 254.

In some illustrative examples, at temperatures less than melting temperature 244, such as infusion temperature 236, resin 204 is still liquid and the thermoplastic veil 214 has diameter 246 of an original value. In some illustrative examples, diameter 246 can have an original value of approximately 35 um. At temperature 234 at or above melting temperature 244 of thermoplastic veil 214, thermoplastic veil 214 expands as it softens or melts with resin 204 still in a liquid state. In some illustrative examples, thermoplastic veil 214 can expand to have diameter 246 of approximately 45-50 um as it softens or melts.

After resin 204 hardens thermoplastic veil 214 is locked into diameter 246 having the expanded size. As thermoplastic veil 214 cools below melting temperature 244 again thermoplastic veil 214 tries to shrink back to diameter 246 having the original size. With the outer surfaces of thermoplastic veil 214 locked in place, cavitation bubbles 256 are formed in the center of thermoplastic veil 254.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, resin infusion and cure tool 202 can further include a vacuum system (not depicted). The vacuum system can be configured to evacuate gap 224. The vacuum system can create a vacuum in gap 224 prior to injecting resin 204 into gap 224.

In some illustrative examples, curing temperature 240 is less than melting temperature 244. In some illustrative examples, curing temperature 240 is sufficient to soften but not melt thermoplastic veil 214 such that thermoplastic veil 214 desirably bonds to resin 204.

Figure 3:
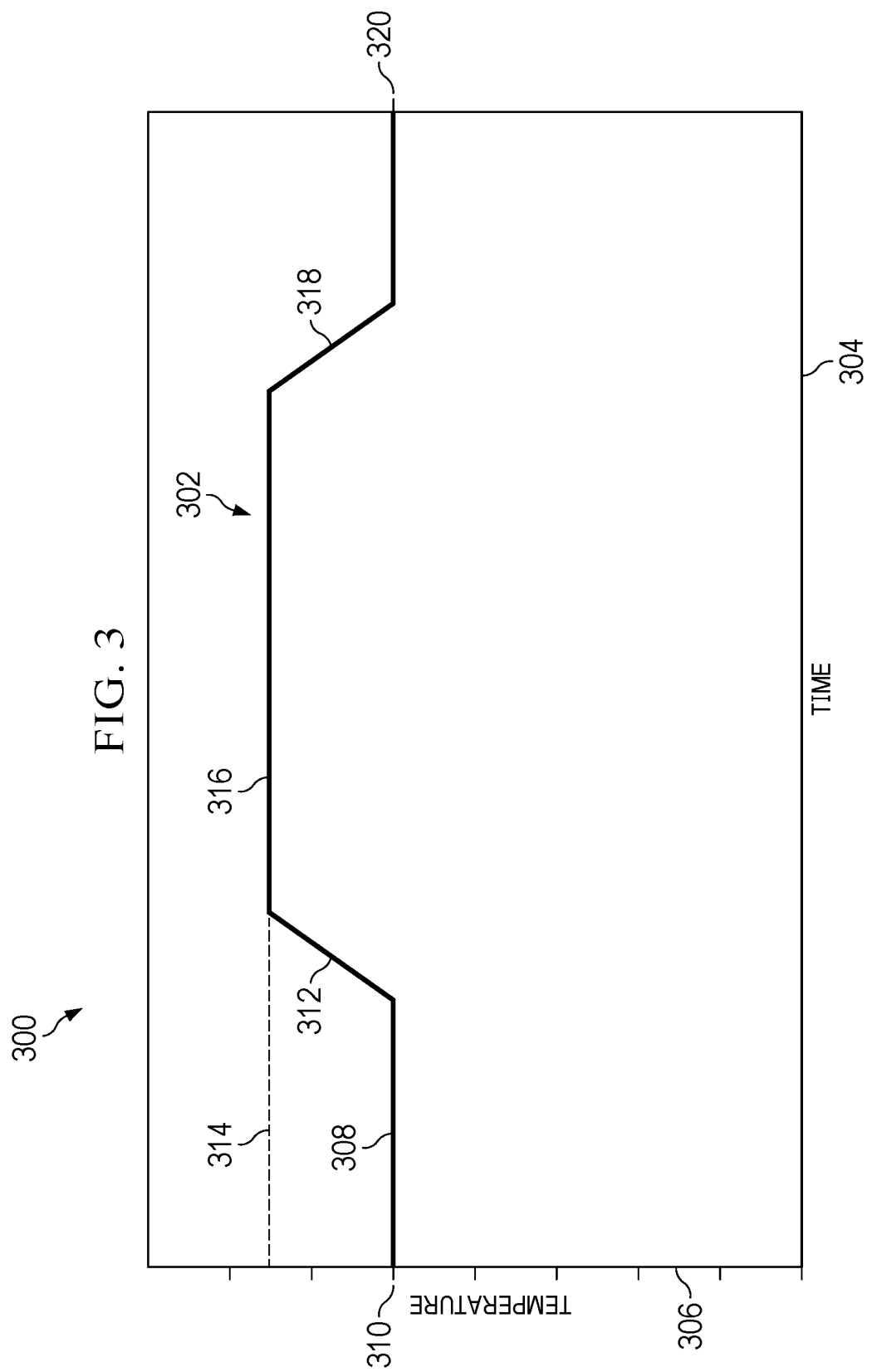
FIG. 3 is an illustration of a temperature chart for an infusion temperature and curing temperature for a high rate resin infusion method in accordance with an illustrative embodiment.

Turning now to FIG. 3, an illustration of a temperature chart for an infusion temperature and curing temperature for a high-rate resin infusion method is depicted in accordance with an illustrative embodiment. Temperature cycle 302 can be used in resin infusion and cure tool 202 of FIG. 2 to form cured composite part 252 of FIG. 2.

Temperature chart 300 depicts temperature cycle 302 for infusion and curing of a composite material with a thermoplastic veil. Temperature chart 300 has time 304 as an X-axis and temperature 306 as a Y-axis. In temperature cycle 302, infusion 308 is performed at infusion temperature 310. In some illustrative examples, infusion temperature 310 is in the range of 130-160 degrees Celsius. After infusion 308, temperature ramp 312 occurs as temperature 306 increases to curing temperature 314. In some illustrative examples, temperature ramp 312 to cure between infusion temperature 310 and curing temperature 314 has a ramp rate of 1-3 degrees Celsius/min. In some illustrative examples, curing temperature 314 is in the range of 165-190 degrees Celsius. In some illustrative examples, a difference between infusion temperature 310 and curing temperature 314 is 40 degrees Celsius or less.

As depicted, curing 316 is carried out at curing temperature 314. In some illustrative examples, curing 316 takes between 45-180 minutes. Following curing 316, temperature ramp 318 reduces the temperature of the composite material.

The cured composite part is removed at removal temperature 320. In some illustrative examples, removal temperature 320 is approximately the same as infusion temperature 310. In some illustrative examples, removal temperature 320 is in the range of 130-160 degrees Celsius.

Figure 4:
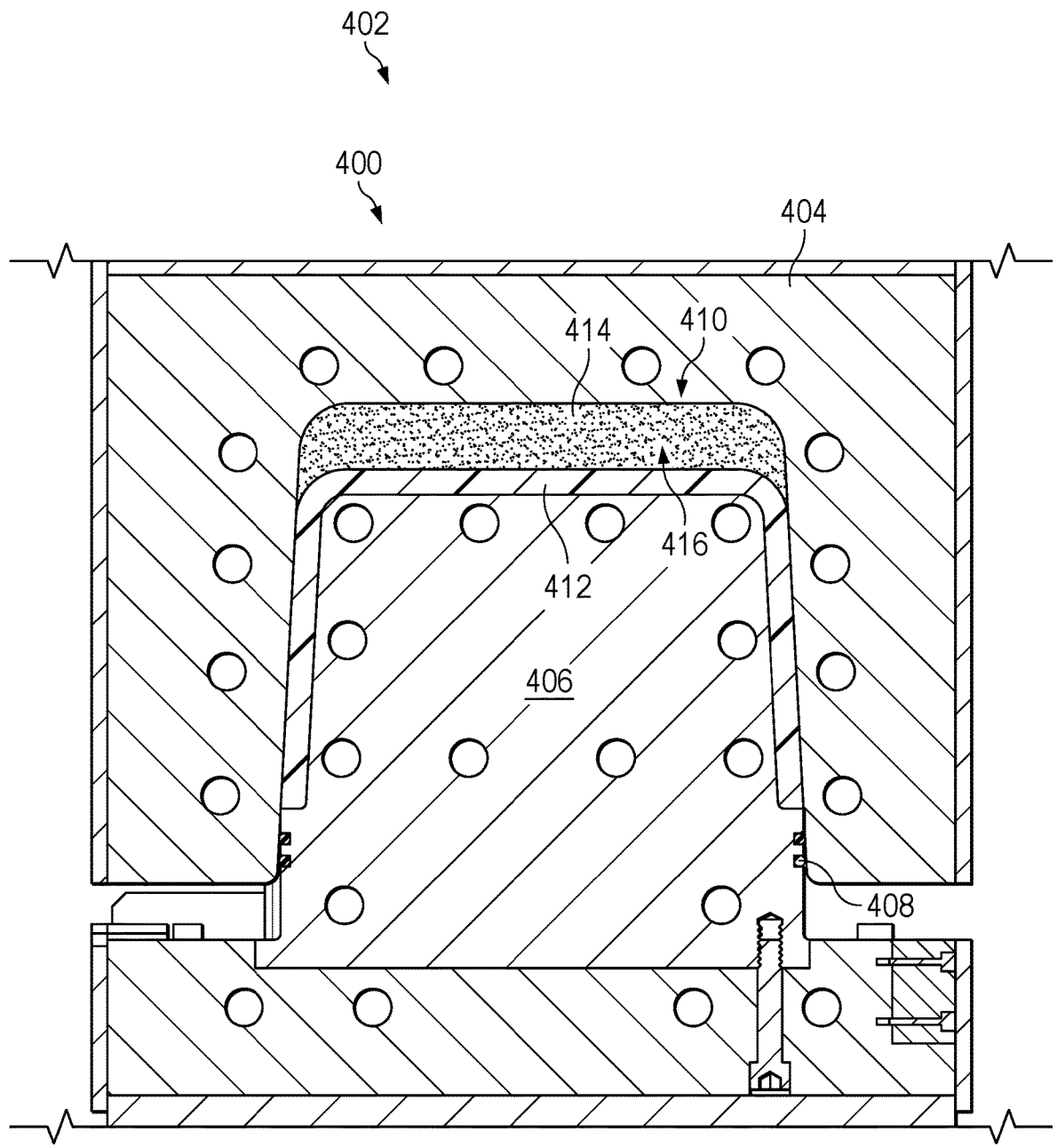
FIG. 4 is an illustration of a resin infusion and cure tool in accordance with an illustrative embodiment.

Turning now to FIG. 4, an illustration of a resin infusion and cure tool is depicted in accordance with an illustrative embodiment. Resin infusion and cure tool 400 is a physical implementation of resin infusion and cure tool 202 of FIG. 2. Temperature cycle 302 can be performed in resin infusion and cure tool 400 to infuse and cure a composite preform.

Resin infusion and cure tool 400 comprises upper mold die 404 and lower mold die 406 sealed together by seals 408. Sealed cavity 410 is present between upper mold die 404 and lower mold die 406. Preform 412 is present on lower mold die 406 in sealed cavity 410. Gap 416 is present between preform 412 and upper mold die 404 in sealed cavity 410. Gap 416 corresponds to a cavity volume equivalent to an amount of resin 414 to infuse preform 412. Resin 414 is injected into gap 416 of sealed cavity 410 while infusion and cure tool 400 is maintained at an infusion temperature.

View 402 is a cross-sectional view through resin infusion and cure tool 400 after resin 414 has been injected into sealed cavity 410 formed between upper mold die 404 and lower mold die 406. By lowering upper mold die 404 towards lower mold die 406, resin 414 is infused into preform 412.

During infusion of resin 414 into preform 412, resin infusion and cure tool 400 is kept at an infusion temperature. After resin 414 is infused into preform 412, the infused preform is cured. To cure resin 414 in preform 412, resin infusion and cure tool 400 is heated from the infusion temperature up to a curing temperature. In some illustrative examples, the difference between the infusion temperature and the curing temperature is up to 40 degrees Celsius.

Figure 5:
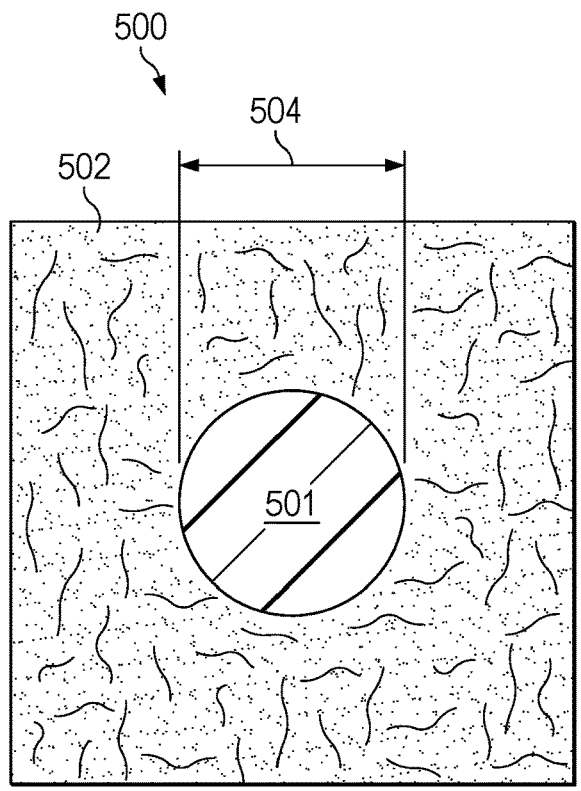
FIG. 5 is an illustration of interactions between a thermoplastic veil and resin prior to curing in accordance with an illustrative embodiment.

Turning now to FIG. 5, an illustration of interactions between a thermoplastic veil and resin prior to curing is depicted in accordance with an illustrative embodiment. Thermoplastic veil 501 and resin 502 can be portions of a composite structure of aircraft 100 of FIG. 1. Thermoplastic veil 501 and resin 502 are illustrations of thermoplastic veil 214 and resin 204 of FIG. 2. Thermoplastic veil 501 and resin 502 can undergo temperature cycle 302 of FIG. 3. Thermoplastic veil 501 and resin 502 can be processed in resin infusion and cure tool 400 of FIG. 4.

In view 500, thermoplastic veil 501 and resin 502 are at a temperature below a melting temperature of thermoplastic veil 501. In view 500, thermoplastic veil 501 is at an initial size, having first diameter 504. In some illustrative examples, thermoplastic veil is in the range of approximately 30 um to approximately 40 um in diameter. In some illustrative examples, thermoplastic veil is approximately 35 um in diameter.

Figure 6:
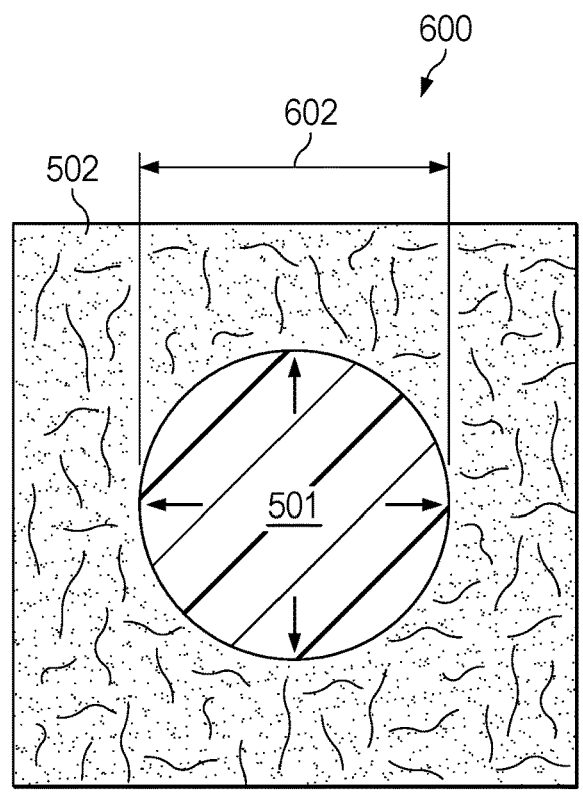
FIG. 6 is an illustration of interactions between a thermoplastic veil and resin during curing in accordance with an illustrative embodiment.

Turning now to FIG. 6, an illustration of interactions between a thermoplastic veil and resin during curing is depicted in accordance with an illustrative embodiment. In view 600, thermoplastic veil 501 and resin 502 are at a curing temperature, such as curing temperature 314 of FIG. 3. In view 600, thermoplastic veil 501 has expanded due to the curing temperature. In view 600, thermoplastic veil 501 has diameter of 602. In some illustrative examples, thermoplastic veil 501 can expand between 158-45%. In some illustrative examples, thermoplastic veil 501 expands to have diameter 602 between approximately 45 um to approximately 50 um. In some illustrative examples, thermoplastic veil 501 expands to have diameter 602 between approximately 45 um to approximately 55 um.

Figure 7:
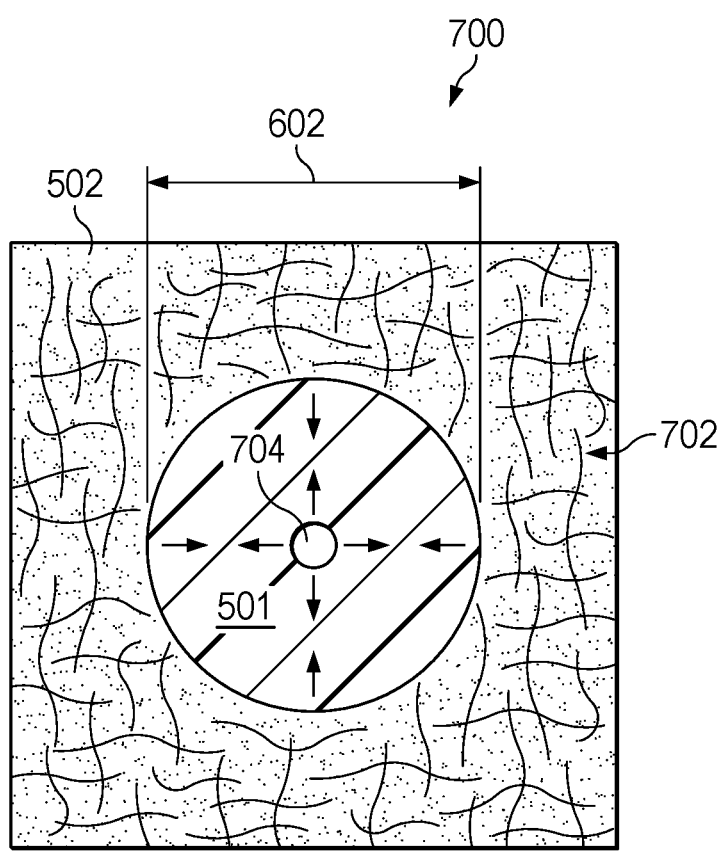
FIG. 7 is an illustration of interactions between a thermoplastic veil and resin after curing in accordance with an illustrative embodiment.

Turning now to FIG. 7, an illustration of interactions between a thermoplastic veil and resin after curing is depicted in accordance with an illustrative embodiment. In view 700, thermoplastic veil 501 and resin 502 have been cooled below a melting temperature of thermoplastic veil 501. As thermoplastic veil 501 cools back below the melting temperature, thermoplastic veil 501 tries to contract back to its original size. In view 700, resin 502 has hardened into network 702, and thermoplastic veil 501 is now bonded to resin 502.

After resin 502 hardens, thermoplastic veil 501 is locked into the expanded size. As thermoplastic veil 501 cools below melting temperature, thermoplastic veil 501 tries to shrink back to size. Due to the bonding of thermoplastic veil 501 to resin 502, thermoplastic veil 501 has nowhere to contract from resulting in a cavitation bubble in the center of the thermoplastic veil. With the outer surfaces of thermoplastic veil 501 locked in place, cavitation bubble 704 is formed in the center of thermoplastic veil 501.

Figure 8:
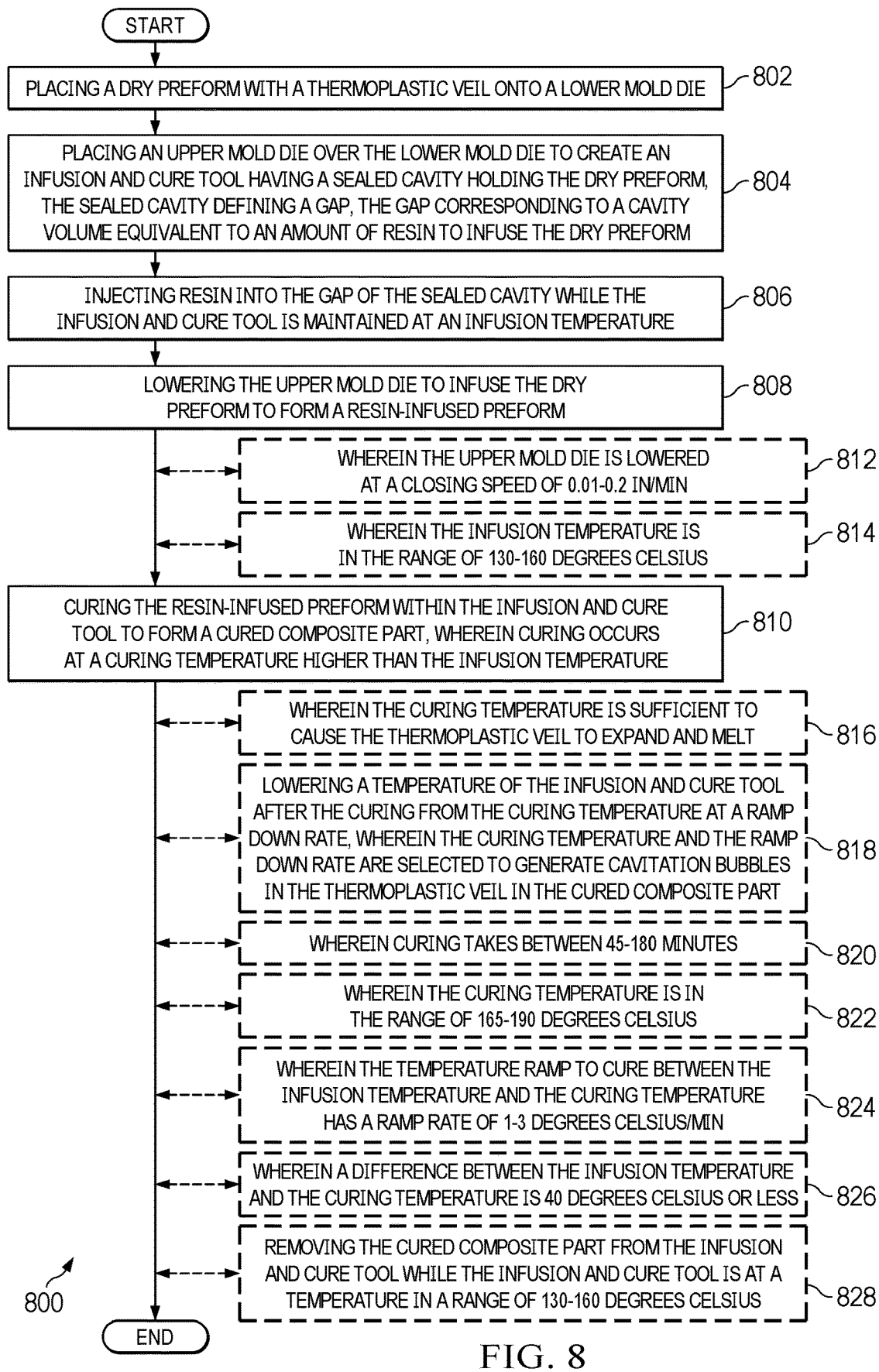
FIG. 8 is a flowchart of a method of compression resin transfer infusion in accordance with an illustrative embodiment.

Turning now to FIG. 8, a flowchart of a method of compression resin transfer infusion is depicted in accordance with an illustrative embodiment. Method 800 can be performed to form a composite part of aircraft 100 of FIG. 1. Method 800 can be performed using resin infusion and cure tool 202 to form cured composite part 252 of FIG. 2. Method 800 can be performed using temperature cycle 302. Method 800 can be performed using resin infusion and cure tool 400 of FIG. 4. Method 800 can infuse and cure thermoplastic veil 501 and resin 502 of FIG. 5.

Method 800 places a dry preform with a thermoplastic veil onto a lower mold die (operation 802). Method 800 places an upper mold die over the lower mold die to create an infusion and cure tool having a sealed cavity holding the dry preform, the sealed cavity defining a gap, the gap corresponding to a cavity volume equivalent to an amount of resin to infuse the dry preform (operation 804). Method 800 injects resin into the gap of the sealed cavity while the infusion and cure tool is maintained at an infusion temperature (operation 806). Method 800 lowers the upper mold die to infuse the dry preform to form a resin-infused preform (operation 808). Method 800 cures the resin-infused preform within the infusion and cure tool to form a cured composite part, wherein curing occurs at a curing temperature higher than the infusion temperature (operation 810). Afterwards, method 800 terminates.

In some illustrative examples, the upper mold die is lowered at a closing speed of 0.01-0.2 in/min (operation 812). In some illustrative examples, the infusion temperature is in the range of 130-160 degrees Celsius (operation 814). In some illustrative examples, the infusion temperature is selected based on a period of latency of the resin.

In some illustrative examples, the curing temperature is sufficient to cause the thermoplastic veil to expand and melt (operation 816). In some illustrative examples, the curing temperature is sufficient to cause the thermoplastic veil to expand and soften. In some illustrative examples, the curing temperature is sufficient to cause the thermoplastic veil to expand between 15%-45%. In some illustrative examples, the curing temperature is over 170 degrees Celsius.

In some illustrative examples, method 800 lowers a temperature of the infusion and cure tool after the curing from the curing temperature at a ramp down rate, wherein the curing temperature and the ramp down rate are selected to generate cavitation bubbles in the thermoplastic veil in the cured composite part (operation 818). During curing the resin forms a network. During curing, the thermoplastic veil bonds to the resin. The cavitation bubbles can result from the thermoplastic veil attempting to shrink to an initial size after the thermoplastic veil bonds to the resin network. In some illustrative examples, curing takes between 45-180 minutes (operation 820).

In some illustrative examples, the curing temperature is in the range of 165-190 degrees Celsius (operation 822). In some illustrative examples, the temperature ramp to cure between the infusion temperature and the curing temperature has a ramp rate of 1-3 degrees Celsius/min (operation 824). In some illustrative examples, a difference between the infusion temperature and the curing temperature is 40 degrees Celsius or less (operation 826).

In some illustrative examples, method 800 removes the cured composite part from the infusion and cure tool while the infusion and cure tool is at a temperature in a range of 130-160 degrees Celsius (operation 828). In some illustrative examples, the cured composite part is removed from the infusion and cure tool at the infusion temperature. In some illustrative examples, the cured composite part is removed from the infusion and cure tool after a ramp down with approximately the same ramp rate as the temperature ramp to cure.

In some illustrative examples, the cured composite part is removed from the infusion and cure tool at approximately the infusion temperature. In some illustrative examples, removing the cured composite part while warm will reduce processing time for the cured composite part. Removing the cured composite part while warm will increase the throughput of the infusion and cure tool. Removing the cured composite part while warm can reduce the downtime between infusion of composite parts. Removing the cured composite part while warm can reduce the energy used to prepare the infusion and cure tool for infusion of the next dry preform.

Figure 9:
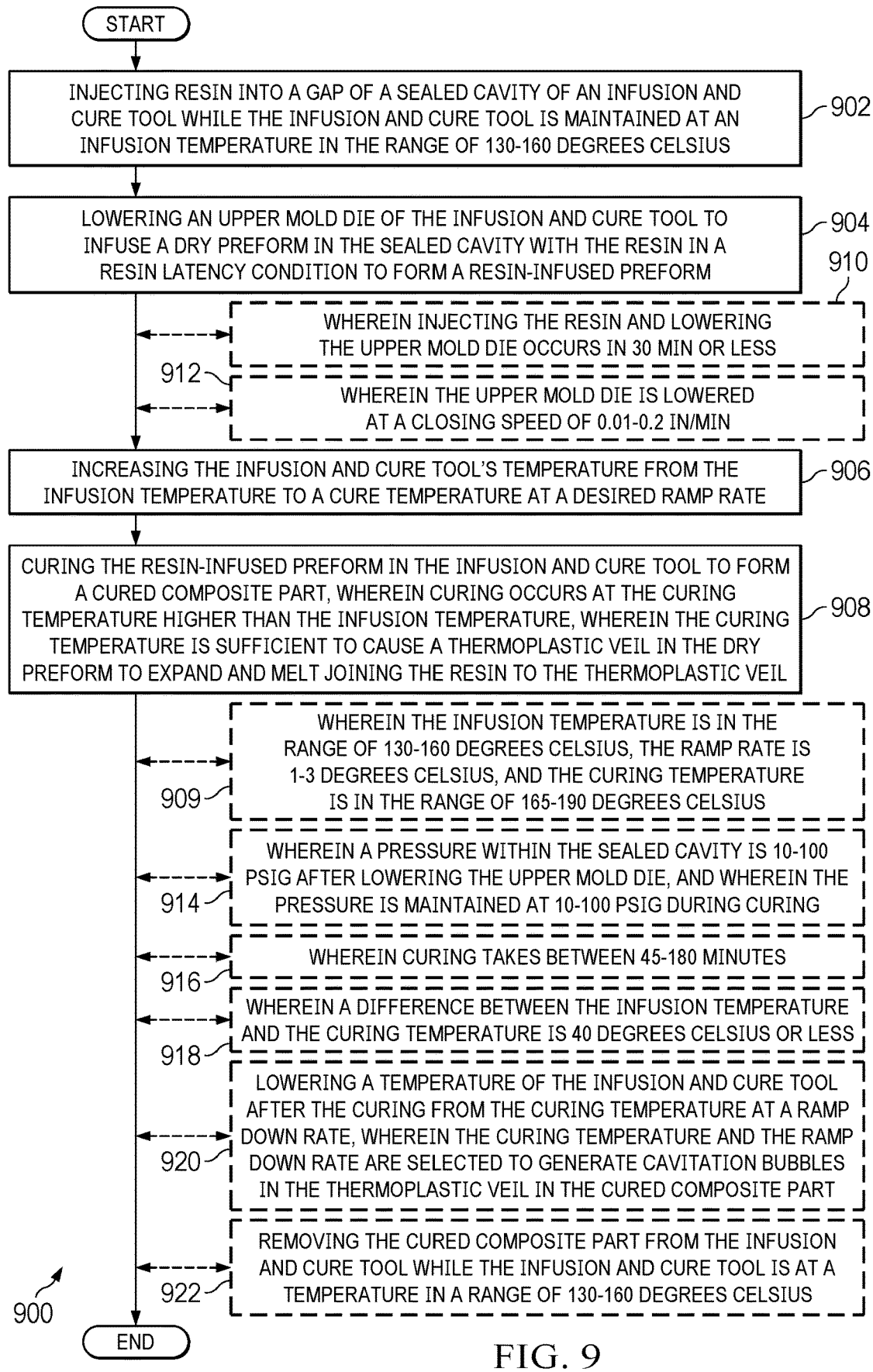
FIG. 9 is a flowchart of a method of compression resin transfer infusion in accordance with an illustrative embodiment.

Turning now to FIG. 9, a flowchart of a method of compression resin transfer infusion is depicted in accordance with an illustrative embodiment. Method 900 can be performed to form a composite part of aircraft 100 of FIG. 1. Method 900 can be performed using resin infusion and cure tool 202 to form cured composite part 252 of FIG. 2. Method 900 can be performed using temperature cycle 302. Method 900 can be performed using resin infusion and cure tool 400 of FIG. 4. Method 900 can infuse and cure thermoplastic veil 501 and resin 502 of FIG. 5.

Method 900 injects resin into a gap of a sealed cavity of an infusion and cure tool while the infusion and cure tool is maintained at an infusion temperature in the range of 130-160 degrees Celsius (operation 902). Method 900 lowers an upper mold die of the infusion and cure tool to infuse a dry preform in the sealed cavity with the resin in a resin latency condition to form a resin-infused preform (operation 904). Method 900 increases the infusion and cure tool's temperature from the infusion temperature to a curing temperature at a desired ramp rate (operation 906). Method 900 cures the resin-infused preform in the infusion and cure tool to form a cured composite part, wherein curing occurs at the curing temperature higher than the infusion temperature, wherein the curing temperature is sufficient to cause a thermoplastic veil in the dry preform to expand and melt, joining the resin to the thermoplastic veil (operation 908). Afterwards, method 900 terminates.

In some illustrative examples, the infusion temperature is in the range of 130-160 degrees Celsius, the ramp rate is 1-3 degrees Celsius, and the curing temperature is in the range of 165-190 degrees Celsius (operation 909). In some illustrative examples, injecting the resin and lowering the upper mold die occurs in 30 min or less (operation 910). The injection time can be selected based on the latency time.

In some illustrative examples, the upper mold die is lowered at a closing speed of 0.01-0.2 in/min (operation 912). Lowering the upper mold die infuses the resin into the dry preform through the thickness of the dry preform.

In some illustrative examples, a pressure within the sealed cavity is 10-100 psig after lowering the upper mold die, and wherein the pressure is maintained at 10-100 psig during curing (operation 914). In some illustrative examples, curing takes between 45-180 minutes (operation 916). In some illustrative examples, a difference between the infusion temperature and the curing temperature is 40 degrees Celsius or less (operation 918).

In some illustrative examples, method 900 lowers a temperature of the infusion and cure tool after the curing from the curing temperature at a ramp down rate, wherein the curing temperature and the ramp down rate are selected to generate cavitation bubbles in the thermoplastic veil in the cured composite part (operation 920). The cavitation bubbles are generated by the thermoplastic veil attempting to shrink to an initial diameter after bonding to the cured resin.

In some illustrative examples, method 900 removes the cured composite part from the infusion and cure tool while the infusion and cure tool is at a temperature in a range of 130-160 degrees Celsius (operation 922). In some illustrative examples, the cured composite part is removed from the infusion and cure tool at approximately the infusion temperature. In some illustrative examples, removing the cured composite part while warm will reduce processing time for the cured composite part. Removing the cured composite part while warm will increase the throughput of the infusion and cure tool. Removing the cured composite part while warm can reduce the downtime between infusion of composite parts. Removing the cured composite part while warm can reduce the energy used to prepare the infusion and cure tool for infusion of the next dry preform.

Figure 10:
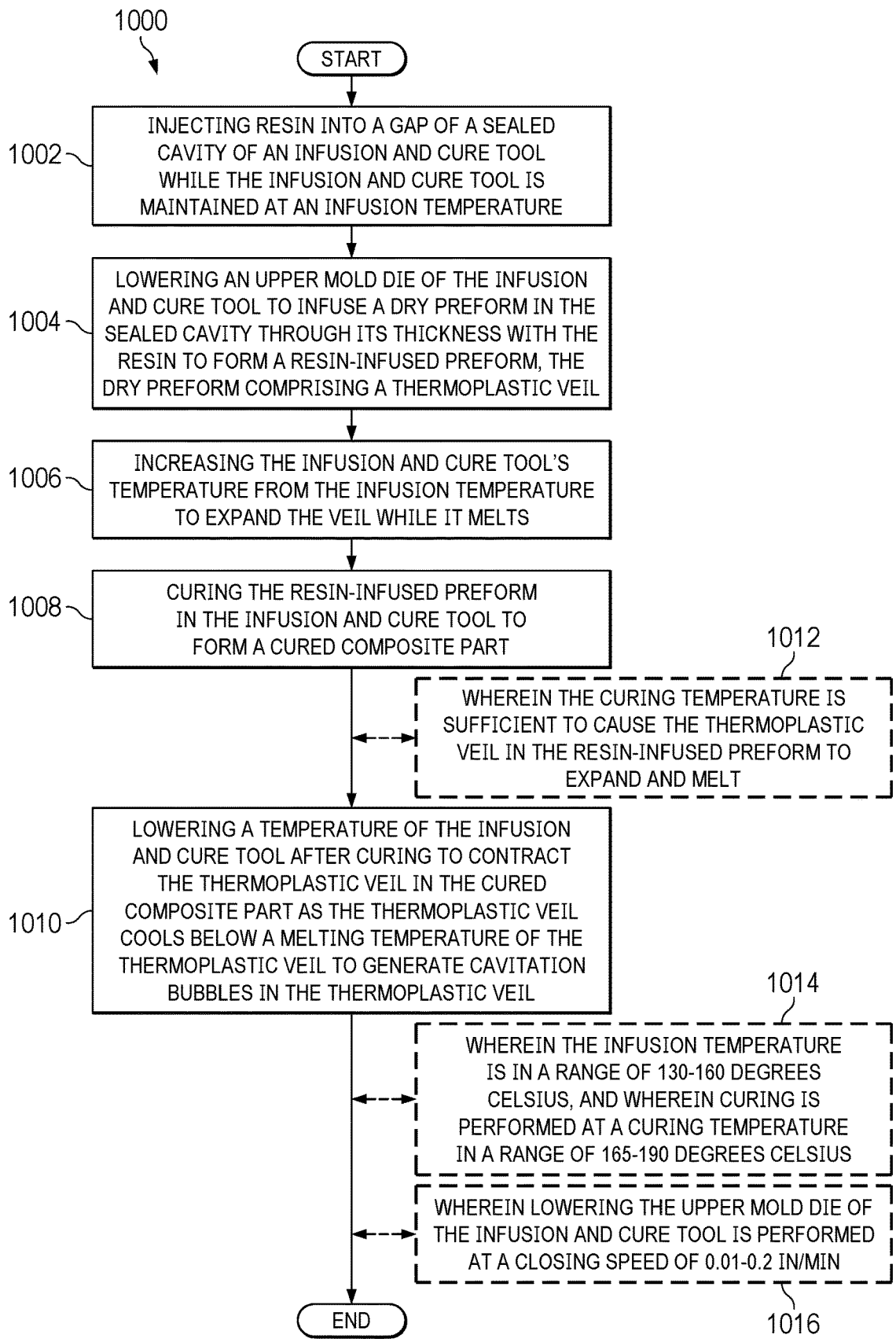
FIG. 10 is a flowchart of a method of compression resin transfer infusion to form cavitation bubbles in the cured composite part in accordance with an illustrative embodiment.

Turning now to FIG. 10, a flowchart of a method of compression resin transfer infusion to form cavitation bubbles in the cured composite part is depicted in accordance with an illustrative embodiment. Method 1000 can be performed to form a composite part of aircraft 100 of FIG. 1. Method 1000 can be performed using resin infusion and cure tool 202 to form cured composite part 252 of FIG. 2. Method 1000 can be performed using temperature cycle 302. Method 1000 can be performed using resin infusion and cure tool 400 of FIG. 4. Method 1000 can infuse and cure thermoplastic veil 501 and resin 502 of FIG. 5.

Method 1000 injects resin into a gap of a sealed cavity of an infusion and cure tool while the infusion and cure tool is maintained at an infusion temperature (operation 1002). Method 1000 lowers an upper mold die of the infusion and cure tool to infuse a dry preform in the sealed cavity through its thickness with the resin to form a resin-infused preform, the dry preform comprising a thermoplastic veil (operation 1004). Method 1000 increases the infusion and cure tool's temperature from the infusion temperature to expand the thermoplastic veil while it melts (operation 1006). Method 1000 cures the resin-infused preform in the infusion and cure tool to form a cured composite part (operation 1008). Method 1000 lowers a temperature of the infusion and cure tool after curing to contract the thermoplastic veil in the cured composite part as the thermoplastic veil cools below a melting temperature of the thermoplastic veil to generate cavitation bubbles in the thermoplastic veil (operation 1010). Afterwards, method 1000 terminates.

In some illustrative examples, the curing temperature is sufficient to cause the thermoplastic veil in the resin-infused preform to expand and melt (operation 1012). In some illustrative examples, the curing temperature is greater than a melting temperature of the thermoplastic veil. In some illustrative examples, the curing temperature is selected so that thermoplastic veil expands sufficiently to cause a cavitation bubble after the thermoplastic veil cools.

In some illustrative examples, the infusion temperature is in a range of 130-160 degrees Celsius, and wherein curing is performed at a curing temperature in a range of 165-190 degrees Celsius (operation 1014). In some illustrative examples, lowering the upper mold die of the infusion and cure tool is performed at a closing speed of 0.01-0.2 in/min (operation 1016).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−10% of a stated target value, maximum, or minimum value.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 812 through operation 828 may be optional. As another example, operation 910 through operation 922 may be optional. As a further example, operation 1012 may be optional.

Figure 11:
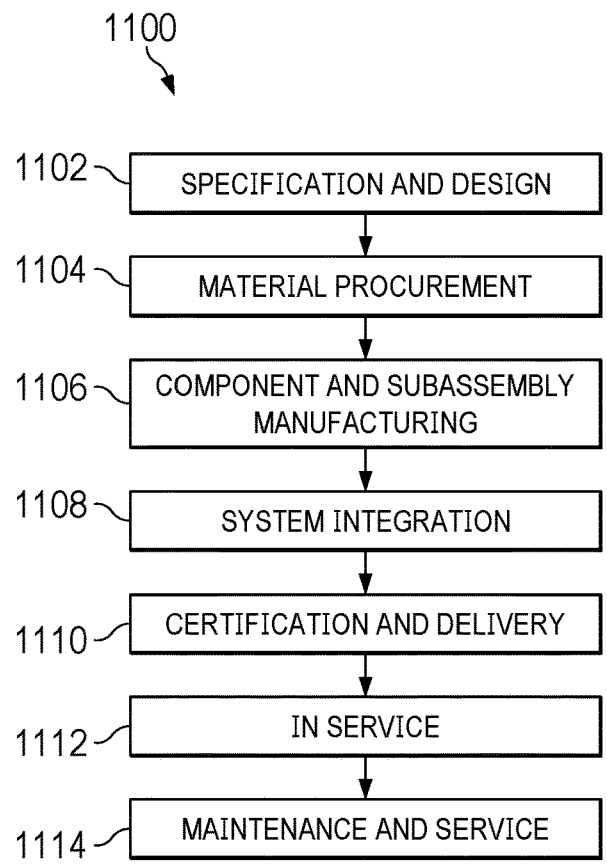
FIG. 11 is an illustration of an aircraft manufacturing and service method in a form of a block diagram in accordance with an illustrative embodiment.
Figure 12:
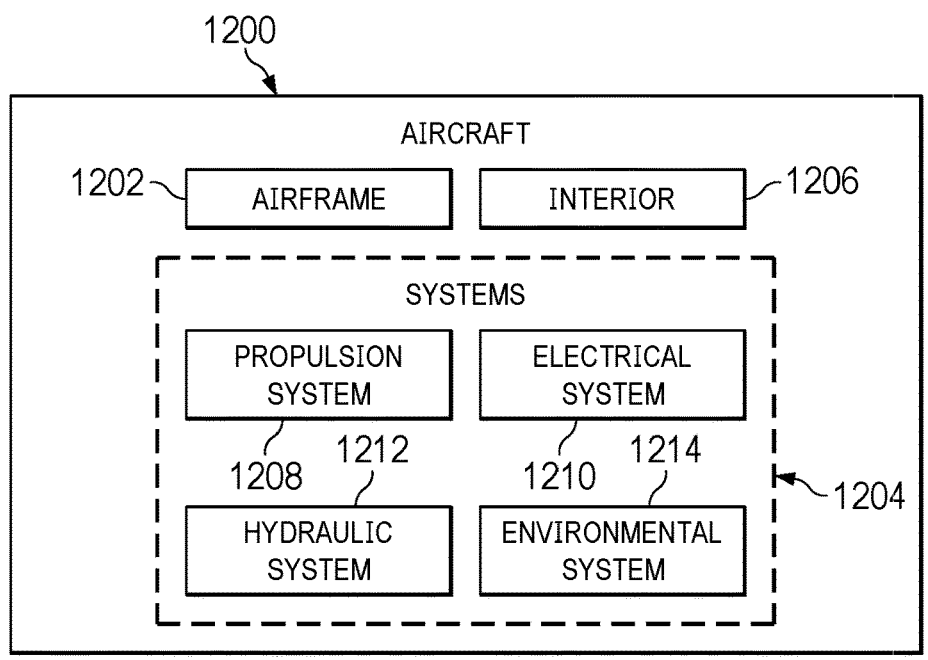
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method in a form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in a form of a block diagram is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

The illustrative examples provide compression resin transfer infusion. A period of resin latency is a period in which the resin remains liquid and does not begin curing. In some illustrative examples, a period of resin latency is in the range of 20-60 min. In some illustrative examples, the resin maintains a viscosity of 100 cps or less. In some illustrative examples, the infusion temperature of the resin infusion and cure tool is in the range of 130-160° C. In some illustrative examples, a closing speed of lowering an upper mold die towards a lower mold die is in the range of 0.01-0.2 in/min. In some illustrative examples, a pressure within the sealed cavity of the resin infusion cure tool at the end of closing is in the range of 10-100 psig.

The resin infusion and cure tool increases temperature from the infusion temperature to a curing temperature. In some illustrative examples, the difference between the infusion temperature and the curing temperature is 40° C. or less.

In some illustrative examples, a ramp rate from the infusion temperature to the curing temperature is in the range from 1-3° C./min.

In some illustrative examples, curing temperature is in the range of 165-190° C. During curing, the pressure in the sealed cavity of the resin infusion and cure tool remains at 10-100 psig. In some illustrative examples, a cure time is in the range of 45-180 mins.

In some illustrative examples, the pressure remains at 10-100 psig during the temperature ramp down from the curing temperature to the part removal temperature. In some illustrative examples, the cured composite part is removed from a hot resin infusion and cure tool in the temperature range of 130-160° C. The cured composite part does not receive additional post cure after removal from the resin infusion and cure tool. The cured composite part comprises a desired level of bonding between the resin and the thermoplastic veil in the preform.

Due to the heat ramp, the resin maintains mobility longer and can gel (vitrify) after the thermoplastic veil reaches its melting temperature. In some illustrative examples, the thermoplastic veil melts over 170 degrees Celsius. As the thermoplastic veil melts it expands. After the thermoplastic veil melts, the resin forms a network around the expanded veil and bonds with the surface of the thermoplastic veil.

As the thermoplastic veil cools back below the melt temp, it tries to contract back to its original size. As the thermoplastic veil is now bonded to the resin it has nowhere to contract from, resulting in a cavitation bubble in the center of the thermoplastic veil.

In some illustrative examples, at temperatures less than the melting temperature, the resin is still liquid and the thermoplastic veil is at an original diameter, such as approximately 35 um. At temperatures at or above a melting temperature of the thermoplastic veil, the thermoplastic veil expands as it softens or melts with the resin still in a liquid state. In some illustrative examples, the thermoplastic veil can expand to approximately 45-50 um as it softens or melts.

After the resin hardens the thermoplastic veil is locked into the expanded size. As the thermoplastic veil cools below the melting temperature again it tries to shrink back to size. With the outer surfaces of the thermoplastic veil locked in place, a cavitation bubble is formed in the center of the thermoplastic veil.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of compression resin transfer infusion comprising:
   placing a dry preform with a thermoplastic veil onto a lower mold die;
   placing an upper mold die over the lower mold die to create an infusion and cure tool having a sealed cavity holding the dry preform, the sealed cavity defining a gap, the gap corresponding to a cavity volume equivalent to an amount of resin to infuse the dry preform;
   injecting resin into the gap of the sealed cavity while the infusion and cure tool is maintained at an infusion temperature;
   lowering the upper mold die to infuse the dry preform to form a resin-infused preform;
   curing the resin-infused preform within the infusion and cure tool to form a cured composite part, wherein curing occurs at a curing temperature higher than the infusion temperature; and
   lowering a temperature of the infusion and cure tool after the curing from the curing temperature at a ramp down rate, wherein the curing temperature and the ramp down rate are selected to generate cavitation bubbles in the thermoplastic veil in the cured composite part.

2. The method of claim 1, wherein the curing temperature is sufficient to cause the thermoplastic veil to expand and melt.

3. The method of claim 1, wherein the upper mold die is lowered at a closing speed of 0.01-0.2 in/min.

4. The method of claim 1, wherein curing takes between 45-180 minutes.

5. The method of claim 1, wherein the infusion temperature is in a range of 130-160 degrees Celsius.

6. The method of claim 1, wherein the curing temperature is in a range of 165-190 degrees Celsius.

7. The method of claim 1, wherein a temperature ramp to cure between the infusion temperature and the curing temperature has a ramp rate of 1-3 degrees Celsius/min.

8. The method of claim 1, wherein a difference between the infusion temperature and the curing temperature is 40 degrees Celsius or less.

9. The method of claim 1 further comprising:
   removing the cured composite part from the infusion and cure tool while the infusion and cure tool is at a temperature in a range of 130-160 degrees Celsius.

10. A method of compression resin transfer infusion comprising:
    injecting resin into a gap of a sealed cavity of an infusion and cure tool while the infusion and cure tool is maintained at an infusion temperature;
    lowering an upper mold die of the infusion and cure tool to infuse a dry preform in the sealed cavity with the resin in a resin latency condition to form a resin-infused preform;
    increasing the infusion and cure tool's temperature from the infusion temperature to a curing temperature at a desired ramp rate;
    curing the resin-infused preform in the infusion and cure tool to form a cured composite part, wherein curing occurs at the curing temperature higher than the infusion temperature, wherein the curing temperature is sufficient to cause a thermoplastic veil in the dry preform to expand and melt, joining the resin to the thermoplastic veil; and
    lowering a temperature of the infusion and cure tool after the curing from the curing temperature at a ramp down rate, wherein the curing temperature and the ramp down rate are selected to generate cavitation bubbles in the thermoplastic veil in the cured composite part.

11. The method of claim 10, wherein the infusion temperature is in a range of 130-160 degrees Celsius, wherein the ramp rate is 1-3 degrees Celsius, and the curing temperature is in a range of 165-190 degrees Celsius.

12. The method of claim 10, wherein the upper mold die is lowered at a closing speed of 0.01-0.2 in/min.

13. The method of claim 11, wherein a pressure within the sealed cavity is 10-100 psig after lowering the upper mold die, and wherein the pressure is maintained at 10-100 psig during curing.

14. The method of claim 10, wherein curing takes between 45-180 minutes.

15. The method of claim 10, wherein a difference between the infusion temperature and the curing temperature is 40 degrees Celsius or less.

16. The method of claim 10 further comprising:
   removing the cured composite part from the infusion and cure tool while the infusion and cure tool is at a temperature in a range of 130-160 degrees Celsius.

17. The method of claim 10, wherein injecting the resin and lowering the upper mold die occurs in 30 min or less.

18. A method of compression resin transfer infusion to form cavitation bubbles in a cured composite part comprising:
   injecting resin into a gap of a sealed cavity of an infusion and cure tool while the infusion and cure tool is maintained at an infusion temperature;
   lowering an upper mold die of the infusion and cure tool to infuse a dry preform in the sealed cavity through its thickness with the resin to form a resin-infused preform, the dry preform comprising a thermoplastic veil;
   increasing the infusion and cure tool's temperature from the infusion temperature to expand the thermoplastic veil while it melts;
   curing the resin-infused preform in the infusion and cure tool to form a cured composite part; and
   lowering the temperature of the infusion and cure tool after curing to contract the thermoplastic veil in the cured composite part as the thermoplastic veil cools below a melting temperature of the thermoplastic veil to generate cavitation bubbles in the thermoplastic veil.

19. The method of claim 18, wherein the infusion temperature is in a range of 130-160 degrees Celsius, and wherein curing is performed at a curing temperature in a range of 165-190 degrees Celsius.

20. The method of claim 18, wherein lowering the upper mold die of the infusion and cure tool is performed at a closing speed of 0.01-0.2 in/min.

21. The method of claim 19, wherein the curing temperature is sufficient to cause the thermoplastic veil in the resin-infused preform to expand and melt.

* * * * *